(12) United States Patent
Umezawa

(10) Patent No.: US 8,697,261 B2
(45) Date of Patent: Apr. 15, 2014

(54) PERPENDICULAR MAGNETIC RECORDING MEDIUM

(75) Inventor: Teiichiro Umezawa, Singapore (SG)

(73) Assignee: WD Media (Singapore) Pte. Ltd., Singapore (SG)

( * ) Notice: Subject to any disclaimer, the term of this patent is extended or adjusted under 35 U.S.C. 154(b) by 182 days.

(21) Appl. No.: 12/934,979

(22) PCT Filed: Mar. 25, 2009

(86) PCT No.: PCT/JP2009/055899
§ 371 (c)(1),
(2), (4) Date: Dec. 20, 2010

(87) PCT Pub. No.: WO2009/119636
PCT Pub. Date: Oct. 1, 2009

(65) Prior Publication Data
US 2011/0104516 A1    May 5, 2011

(30) Foreign Application Priority Data
Mar. 28, 2008    (JP) .................................. 2008-088122

(51) Int. Cl.
*G11B 5/66*    (2006.01)
(52) U.S. Cl.
USPC .......................................... 428/829; 428/832
(58) Field of Classification Search
USPC .................................................. 360/131, 135
See application file for complete search history.

(56) References Cited

U.S. PATENT DOCUMENTS

| | | | | |
|---|---|---|---|---|
| 7,867,638 B2 * | 1/2011 | Sakawaki et al. | ............. | 428/829 |
| 7,875,373 B2 * | 1/2011 | Hirayama et al. | ......... | 428/836.2 |
| 8,003,237 B2 * | 8/2011 | Sonobe et al. | ................ | 428/828 |
| 2006/0057431 A1 * | 3/2006 | Tamai et al. | ................ | 428/836.2 |
| 2008/0113221 A1 | 5/2008 | Hirayama et al. | | |
| 2008/0220157 A1 * | 9/2008 | Takenoiri et al. | ............. | 427/131 |

FOREIGN PATENT DOCUMENTS

| | | | |
|---|---|---|---|
| JP | 2006-085742 A | 3/2006 | |
| JP | 2006-268972 A | 10/2006 | |
| JP | 2008-123626 A | 5/2008 | |
| JP | 2009-099243 A | 5/2009 | |

* cited by examiner

*Primary Examiner* — Holly Rickman

(57) ABSTRACT

An object of the present invention is to increase an electromagnetic transducing characteristic (in particular, SNR) by further promoting separation and isolation of magnetic grains of a magnetic recording layer (122) in a perpendicular magnetic recording medium (100). Thus, a typical structure of the perpendicular magnetic recording medium (100) according to the present invention includes, on a substrate (110), at least a non-magnetic granular layer (120) having a granular structure in which a grain boundary part including one or a plurality of oxides is formed between non-magnetic grains each continuously grown in a columnar shape and a magnetic recording layer (122) formed continuously with the non-magnetic granular layer (120) and having a granular structure in which a grain boundary part including one or a plurality of oxides is formed between magnetic grains continuously grown in a columnar shape in this order, and at least one oxide included in the grain boundary part of the non-magnetic granular layer (120) and at least one oxide included in the grain boundary part of the magnetic recording layer (122) are oxides of a same composition.

7 Claims, 5 Drawing Sheets

*FIG. 3*

| | FILM STRUCTURE | | COERCIVE FORCE | SN RATIO | OVERALL EVALUATION |
|---|---|---|---|---|---|
| EXAMPLE 1 | (SINGLE LAYER) | SiO$_2$+TiO$_2$ | 5470 | 18.8 | ◎ |
| | FIRST MAGNETIC RECORDING LAYER | SiO$_2$+Cr$_2$O$_3$ | | | |
| | NON-MAGNETIC GRANULAR LAYER | SiO$_2$ | | | |
| EXAMPLE 2 | SECOND MAGNETIC RECORDING LAYER | SiO$_2$ | 4980 | 18.6 | ◎ |
| | FIRST MAGNETIC RECORDING LAYER | SiO$_2$+Cr$_2$O$_3$ | | | |
| | NON-MAGNETIC GRANULAR LAYER | SiO$_2$ | | | |
| EXAMPLE 3 | (SINGLE LAYER) | SiO$_2$+TiO$_2$ | 5250 | 18.3 | ○ |
| | FIRST MAGNETIC RECORDING LAYER | SiO$_2$ | | | |
| | NON-MAGNETIC GRANULAR LAYER | SiO$_2$ | | | |
| EXAMPLE 4 | SECOND MAGNETIC RECORDING LAYER | TiO$_2$ | 4980 | 18.4 | ○ |
| | FIRST MAGNETIC RECORDING LAYER | SiO$_2$+TiO$_2$ | | | |
| | NON-MAGNETIC GRANULAR LAYER | SiO$_2$ | | | |
| COMPARISON EXAMPLE 1 | SECOND MAGNETIC RECORDING LAYER | SiO$_2$+TiO$_2$ | 5290 | 18.1 | × |
| | FIRST MAGNETIC RECORDING LAYER | Cr$_2$O$_3$ | | | |
| | NON-MAGNETIC GRANULAR LAYER | SiO$_2$ | | | |
| COMPARISON EXAMPLE 2 | SECOND MAGNETIC RECORDING LAYER | SiO$_2$+TiO$_2$ | 5090 | 17.9 | × |
| | FIRST MAGNETIC RECORDING LAYER | SiO$_2$+TiO$_2$ | | | |
| | NON-MAGNETIC GRANULAR LAYER | Cr$_2$O$_3$ | | | |

PERPENDICULAR MAGNETIC RECORDING MEDIUM

TECHNICAL FIELD

The present invention relates to a perpendicular magnetic recording medium implemented on an HDD (hard disk drive) of a perpendicular magnetic recording type or the like.

BACKGROUND ART

With an increase in capacity of information processing in recent years, various information recording technologies have been developed. In particular, the surface recording density of an HDD using magnetic recording technology is continuously increasing at an annual rate of approximately 100%. In recent years, an information recording capacity exceeding 160 GB per one perpendicular magnetic recording medium with a 2.5-inch diameter for use in an HDD or the like has been desired. To fulfill such demands, an information recording density exceeding 250 Gbits per one square inch is desired to be achieved.

To attain a high recording density in a perpendicular magnetic recording medium for use in an HDD or the like, a perpendicular magnetic recording medium of a perpendicular magnetic recording type has been suggested in recent years. In the perpendicular magnetic recording type, the axis of easy magnetization of a magnetic recording layer is adjusted so as to be oriented in a direction perpendicular to the base surface. Thus, in the perpendicular magnetic recording type, compared with the in-plane recording type, a thermal fluctuation phenomenon can be suppressed, and therefore the perpendicular magnetic recording type is suitable for increasing the recording density.

And, in the perpendicular magnetic recording type, the magnetic recording layer can have a granular structure in which a non-magnetic substance (mainly an oxide) is subjected to segregation between magnetic particles (magnetic grains) to form a grain boundary part. With this, magnetic particles can be isolated and made finer, thereby improving an SNR (Signal/Noise Ratio) and a coercive force Hc. Patent Document 1 describes a configuration in which magnetic particles are epitaxially grown to form a granular structure in a columnar shape.

Also, there is a case of providing a non-magnetic granular layer (which may also referred to as a layer for promoting finer grains or an onset layer) of a non-magnetic granular structure in which $SiO_2$ is subjected to segregation in the grain boundary of a non-magnetic metal of CoCr (Patent Document 2). The non-magnetic granular layer is formed above a Ru ground layer. However, the Ru ground layer is of crystals that are not isolated but are continuing. Therefore, when a granular layer is tried to be formed on the Ru layer, separation is not necessarily sufficient at an initial stage. For this reason, crystal orientation is broken on the base of the granular columns, and the state becomes such that the base is horizontally spread to be coupled together. Such breakage in crystal orientation invites a decrease in SNR and coercive force Hc. Also, coupling of the crystal particles invites a decrease in SNR after all. Thus, the non-magnetic granular layer is to promote separation and isolation of granular (magnetic particles) of the magnetic recording layer even when they are connected together, by forming a granular bottom portion with a non-magnetic substance.

Patent Document 1: Japanese Unexamined Patent Application Publication No. 2003-217107

Patent Document 2: Japanese Unexamined Patent Application Publication No. 2006-268972

SUMMARY OF INVENTION

Problems to be Solved by the Invention

As described above, the recording density of the magnetic recording medium is increasing. However, a further improvement in recording density in the future is demanded. There are a variety of important elements for increasing the recording density, including an enhancement in magnetostatic characteristic, such as a coercive force Hc and an inverted-magnetic-domain nucleation magnetic field Hn, and an enhancement in electromagnetic transducing characteristic, such as overwrite characteristic and an SNR (Signal-Noise Ratio). In particular, to increase the recording density, it is extremely important to separate and isolate magnetic grains to improve an SNR.

As described above, in the perpendicular magnetic recording medium, an oxide is subjected to segregation in the magnetic recording layer, thereby achieving isolation and making the particles finer. As an oxide, various materials have been studied. Furthermore, in recent years, studies have been conducted in which two or more magnetic recording layers are provided to achieve high coercive force Hc and SNR, overwrite characteristic, and others.

In making magnetic particles finer and isolating them, the thickness in a horizontal direction (in-plane direction) of an oxide subjected to segregation in a grain boundary has an influence. When the amount of the oxide is increased, an SNR at the time of high recording density is improved. On the other hand, when the amount of the oxide is increased too much, the coercive force Hc and perpendicular magnetic anisotropy are degraded. That is, a degradation in thermal stability and an increase in noise pause problems. For this reason, although it is effective to make an oxide contained in the grain boundary, the amount of the oxide to be contained has an upper limit in itself. Therefore, a limitation of an improvement in making particles finer and isolating them is beginning to appear.

An object of the present invention to provide a perpendicular magnetic recording medium capable of enhancing an electromagnetic transducing characteristic (in particular, SNR) and a magnetostatic characteristic (in particular, the coercive force Hc) by further promoting separation and isolation of the magnetic grains of the magnetic recording layer.

Means for Solving the Problem

To solve the above problem, a typical structure of the perpendicular magnetic recording medium according to the present invention includes: on a substrate, at least a non-magnetic granular layer having a granular structure in which a grain boundary part including one or a plurality of oxides is formed between non-magnetic grains each continuously grown in a columnar shape; and a magnetic recording layer formed continuously with the non-magnetic granular layer and having a granular structure in which a grain boundary part including one or a plurality of oxides is formed between magnetic grains continuously grown in a columnar shape in this order, wherein at least one oxide included in the grain boundary part of the non-magnetic granular layer and at least one oxide included in the grain boundary part of the magnetic recording layer are oxides of a same composition.

According to the above structure, by adding a common oxide to the non-magnetic granular layer and the magnetic recording layer, an affinity between the grain boundary parts at each interface can be increased. Therefore, not only the crystal grains but also the grain boundary parts continuously grow from a lower layer. Thus, separation and isolation of the magnetic grains of the magnetic recording layer can be further promoted. And, in the magnetic recording layer, an electromagnetic transducing characteristic (in particular, SNR) and a magnetostatic characteristic (in particular, the coercive force Hc) can be enhanced.

The magnetic recording layer may include a first magnetic recording layer formed continuously with the non-magnetic granular layer and having a granular structure in which a grain boundary part including a plurality of oxides is formed between magnetic grains continuously grown in a columnar shape, and a second magnetic recording layer formed continuously with the first magnetic recording layer and having a granular structure in which a grain boundary part including one or a plurality of oxides is formed between magnetic grains continuously grown in a columnar shape, and at least one oxide included in the grain boundary part of the first magnetic recording layer and at least one oxide included in the grain boundary part of the second magnetic recording layer may be oxides of a same composition.

According to the above structure, the magnetic recording layer is divided into continuing layers of a first magnetic recording layer and a second magnetic recording layer and, by adding a common oxide to the first magnetic recording layer and the second magnetic recording layer, an affinity between the grain boundary parts at each interface can be increased. Therefore, not only the crystal grains but also the grain boundary parts continuously grow from a lower layer. Thus, separation and isolation of the magnetic grains of the second magnetic recording layer, which is a main recording layer, can be further promoted. And, in the magnetic recording layer including the first magnetic recording layer and the second magnetic recording layer, an electromagnetic transducing characteristic (in particular, SNR) and a magnetostatic characteristic (in particular, the coercive force Hc) can be enhanced.

The oxides of the same composition included in the grain boundary part of the non-magnetic granular layer and the grain boundary part of the magnetic recording layer each may have a percentage content not less than 30 mol % and not more than 70 mol % in the grain boundary part. In detail, when one is a single oxide and the other is a composite oxide, an oxide of a same composition included in the other side as one included in one side may be not less than 30 mol % and not more than 70 mol %. Also, when both are composite oxides, a percentage content of an oxide of a same oxide in each grain boundary part may be not less than 30 mol % and not more than 70 mol %.

With this structure, when all oxides included in the grain boundary part of the non-magnetic granular layer are assumed to have 100 mol % and all oxides included in the grain boundary part of the magnetic recording layer are assumed to have 100 mol %, from a percentage content of an oxide of a same composition included in the grain boundary part of the non-magnetic granular layer and the grain boundary part of the magnetic recording layer, a relation between the electromagnetic transducing characteristic (in particular, SNR) and the magnetostatic characteristic (in particular, the coercive force Hc) can be known. Also, the SNR and the coercive force Hc can be enhanced.

In the grain boundary part between the non-magnetic granular layer and the first magnetic recording layer or between the first magnetic recording layer and the second magnetic recording layer, oxides of a same composition included in a grain boundary part of an adjacent layer each may have a percentage content not less than 30 mol % and not more than 70 mol % in the grain boundary part.

When all oxides included in the grain boundary parts of the non-magnetic granular layer, the first magnetic recording layer, and the second magnetic recording layer are assumed to have 100 mol %, from a percentage content of an oxide of a same composition included in the grain boundary parts of the non-magnetic granular layer, the first magnetic recording layer, and the second magnetic recording layer, a relation between the electromagnetic transducing characteristic (in particular, SNR) and the magnetostatic characteristic (in particular, the coercive force Hc) can be known. Also, the SNR and the coercive force Hc can be enhanced.

The non-magnetic granular layer, the first magnetic recording layer, and the second magnetic recording layer each may have a film thickness so as to have a relation of non-magnetic granular layer<the first magnetic recording layer<the second magnetic recording layer. By finding a relation among the film thicknesses, an efficient film thickness can be obtained from the relation between the SNR and the coercive force Hc.

Effect of the Invention

According to the perpendicular magnetic recording medium of the present invention, with a common oxide being included in the non-magnetic granular layer and the magnetic recording layer, the grain boundary part continuously grows. Therefore, it is possible to promote separation and isolation of magnetic grains of the magnetic recording layer, finer magnetic grains, and improvement in orientation thereof; to increase an electromagnetic transducing characteristic (in particular, SNR) and a magnetostatic characteristic (in particular, the coercive force Hc); and to further increase the recording density.

BRIEF DESCRIPTION OF DRAWINGS

[FIG. 3] A diagram depicting examples and comparison examples of oxides included in the non-magnetic granular layer, a first magnetic recording layer, and a second magnetic recording layer.

DESCRIPTION OF REFERENCE NUMERALS

Figure 1:
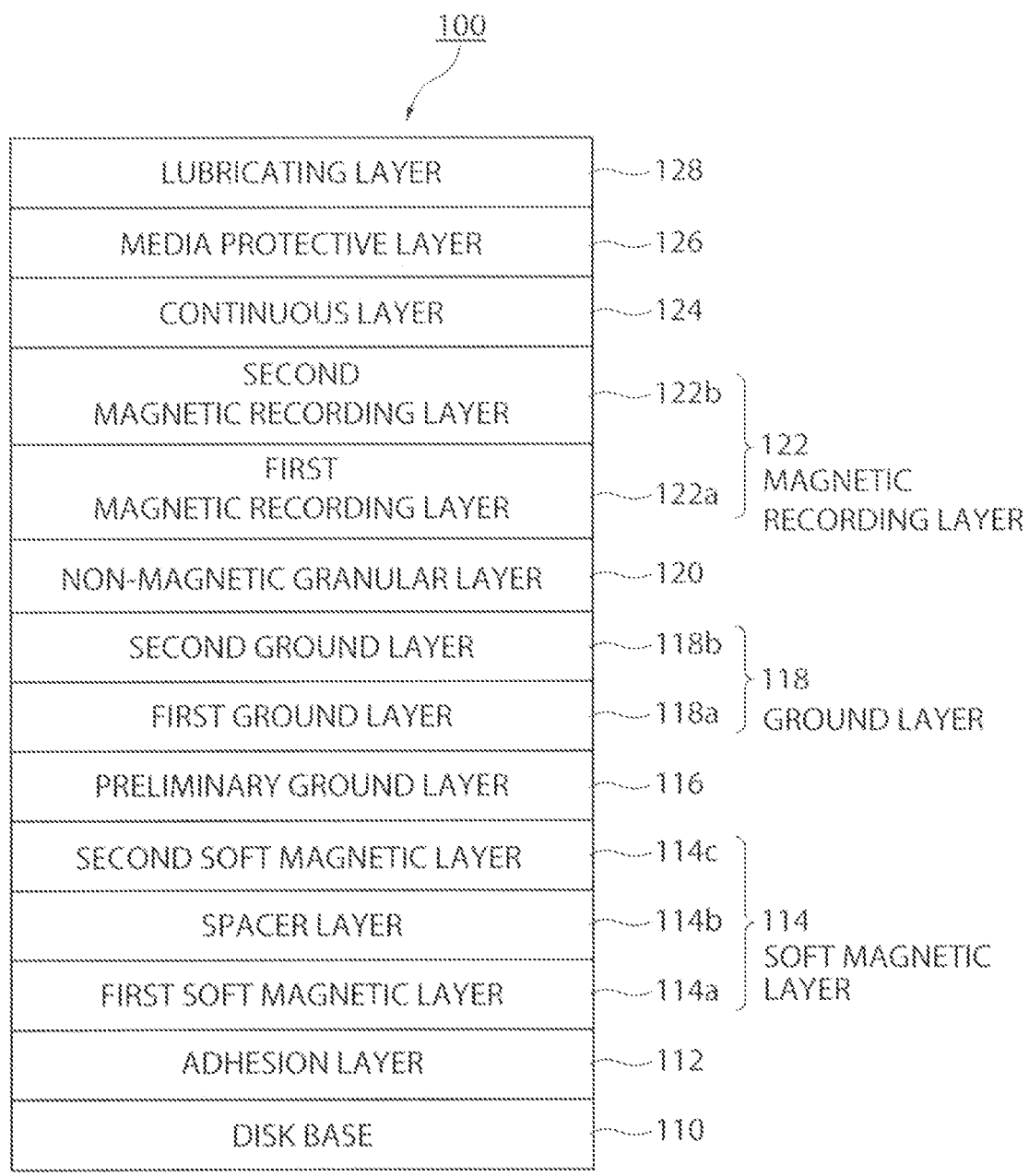
[FIG. 1] A diagram for describing the structure of a perpendicular magnetic recording medium according to an embodiment.

100 . . . perpendicular magnetic recording medium
110 . . . disk base
112 . . . adhesion layer
114 . . . soft magnetic layer
114a . . . first soft magnetic layer
114b . . . spacer layer
114c . . . second soft magnetic layer
116 . . . preliminary ground layer
118 . . . ground layer
118a . . . first ground layer
118b . . . second ground layer 120 . . . non-magnetic granular layer
122 . . . magnetic recording layer
122a . . . first magnetic recording layer
122b . . . second magnetic recording layer
124 . . . continuous layer
126 . . . medium protective layer
128 . . . lubricating layer
200 . . . first oxide A
202 . . . second oxide B
204 . . . third oxide C

BEST MODE FOR CARRYING OUT THE INVENTION

In the following, with reference to the attached drawings, preferred embodiments of the present invention are described in detail. The dimensions, materials, and others such as specific numerical values shown in these embodiments are merely examples so as to facilitate understanding of the invention, and are not meant to restrict the present invention unless otherwise specified. Note that, in the specification and drawings, components having substantially the same functions and structures are provided with the same reference characters and are not redundantly described, and components not directly relating to the present invention are not shown in the drawings.

(Embodiments)

An embodiment of the method of manufacturing a perpendicular magnetic recording medium according to the present invention is described. FIG. 1 is a diagram for describing the structure of a perpendicular magnetic recording medium 100 according to the present embodiment. The perpendicular magnetic recording medium 100 depicted in FIG. 1 is configured of a disk base 110, an adhesion layer 112, a first soft magnetic layer 114a, a spacer layer 114b, a second soft magnetic layer 114c, a preliminary ground layer 116, a first ground layer 118a, a second ground layer 118b, a non-magnetic granular layer 120, a first magnetic recording layer 122a, a second magnetic recording layer 122b, a continuous layer 124, a medium protective layer 126, and a lubricating layer 128. Note that the first soft magnetic layer 114a, the spacer layer 114b, and the second soft magnetic layer 114c together form a soft magnetic layer 114. The first ground layer 118a and the second ground layer 118b together form a ground layer 118. The first magnetic recording layer 122a and the second magnetic recording layer 122b together form a magnetic recording layer 122.

As described below, in the perpendicular magnetic recording medium 100 shown in the present embodiment, either or both of the first magnetic recording layer 122a and the second magnetic recording layer 122b of the magnetic recording layer 122 contain oxides of a plurality of types (hereinafter referred to as a "composite oxide"), thereby causing segregation of the composite oxide in a non-magnetic grain boundary.

For the disk base 110, a glass disk molded in a disk shape by direct-pressing amorphous aluminosilicate glass can be used. Note that the type, size, thickness, and others of the glass disk are not particularly restricted. A material of the glass disk can be, for example, aluminosilicate glass, soda lime glass, soda alumino silicate glass, aluminoborosilicate glass, borosilicate glass, quartz glass, chain silicate glass, or glass ceramic, such as crystallized glass. This glass disk is sequentially subjected to grinding, polishing, and chemical strengthening, thereby allowing the smooth, non-magnetic disk base 110 made of chemically-strengthened glass disk to be obtained.

On the disk base 110, the adhesion layer 112 to the continuous layer 124 are sequentially formed by DC magnetron sputtering. And the medium protective layer 126 can be formed by CVD. Then, the lubricating layer 128 can be formed by dip coating. Note that, in view of high productivity, using an in-line-type film forming method is also preferable. In the following, the structure of each layer and its manufacturing method are described.

The adhesion layer 112 is an amorphous ground layer. The adhesion layer 112 is formed in contact with the disk base 110, and includes a function of increasing a peel strength between the soft magnetic layer 114 formed on this layer and the disk base 110, and also a function of making crystal grains of each layer formed on this layer finer and more uniform. When the disk base 110 is made of amorphous glass, the adhesion layer 112 is preferably an amorphous alloy film so as to comply with that amorphous glass surface.

As the adhesion layer 112, for example, any can be selected from a CrTi-type amorphous layer, a CoW-type amorphous layer, a CrW-type amorphous layer, a CrTa-type amorphous layer, and a CrNb-type amorphous layer. Among all, a CrTi-type alloy film is particularly preferable because of forming an amorphous metal film containing microcrystallines. The adhesion layer 112 may be a single layer formed of a single material, but may be formed by multilayering a plurality of layers. For example, a CoW layer or a CrW layer may be formed on a CrTi layer. These adhesion layers 112 are preferably subjected to sputtering with a material containing carbon dioxide, carbon monoxide, nitrogen, or oxygen, or have their surface layer exposed with any of these gases.

The soft magnetic layer 114 is a layer in which a magnetic path is temporarily formed at the time of recording so as to let a magnetic flux pass through a recording layer in a perpendicular direction in a perpendicular magnetic recording type. By interposing the non-magnetic spacer layer 114b between the first soft magnetic layer 114a and the second soft magnetic layer 114c, the soft magnetic layer 114 can be configured to include Antiferro-magnetic exchange coupling (AFC). With this, magnetizing directions of the soft magnetic layer 114 can be aligned with high accuracy along the magnetic path (magnetic circuit). Thus, the number of perpendicular components in the magnetizing direction becomes extremely small, and therefore noise occurring from the soft magnetic layer 114 can be reduced. As the composition of the first soft magnetic layer 114a and the second soft magnetic layer 114c, a cobalt-type alloy, such as CoTaZr; a Co—Fe-type alloy, such as CoCrFeB and FeCoTaZr; a Ni—Fe-type alloy having a [Ni—Fe/Sn]n multilayered structure or the like can be used.

The preliminary ground layer 116 is a non-magnetic alloy layer. And the preliminary ground layer 116 includes an operation of protecting the soft magnetic layer 114 and a function of orienting in a disk perpendicular direction an easy axis of magnetization of a hexagonal close-packed structure (hcp structure) included in the ground layer 118 formed on the preliminary ground layer.

In the preliminary ground layer 116, a (111) surface of a face-centered cubic structure (fcc structure) are preferably parallel to a main surface of the disk base 110. Also, the preliminary ground layer 116 may have a structure in which these crystal structures and amorphous are mixed. As a material of the preliminary ground layer 116, a selection can be made from Ni, Cu, Pt, Pd, Zr, Hf, Nb, and Ta. Furthermore, an alloy including any of these metals as a main element and any one or more additional elements from among Ti, V, Ta, Cr, Mo, and W may be used. For example, NiW, CuW, or CuCr can be suitably selected.

The ground layer 118 has a hcp structure, and has an operation of growing crystals of the hcp structure of the magnetic recording layer 122 as a granular structure. Therefore, as the crystal orientation of the ground layer 118 is higher, that is, a (0001) surface of a crystal of the ground layer 118 is more parallel to the main surface of the disk base 110, the orientation of the magnetic recording layer 122 can be improved. As a material of the ground layer 118, Ru is typical. Other than that, a selection can be made from RuCr and RuCo. Ru has a hcp structure, and a lattice space of the crystal is similar to that of Co. Therefore, the magnetic recording layer having Co as a main component can be oriented in good condition.

When the ground layer 118 is made of Ru, by changing the gas pressure at the time of sputtering, a two-layer structure made of Ru can be achieved. Specifically, when the second ground layer 118b on an upper-layer side is formed, the gas pressure of Ar is made higher than that when the first ground layer 118a on a lower-layer side is formed. When the gas pressure is made higher, a free traveling distance of plasma ions to be sputtered is shortened, and therefore the film-forming speed becomes slow. Therefore, crystal orientation can be improved. Also, with a high pressure, the size of the crystal lattice becomes smaller. Since the size of the crystal lattice of Ru is larger than that of the crystal lattice of Co, when the crystal lattice of Ru is made smaller, it becomes closer to that of Co, thereby further improving the crystal orientation of the Co granular layer.

The non-magnetic granular layer 120 is a non-magnetic granular layer. A non-magnetic granular layer 120 is formed on the hcp crystal structure of the ground layer 118. And, on the non-magnetic granular layer 120, making a granular layer of the first magnetic recording layer 122a grown, an operation of separating the magnetic granular layer from a stage of initial growth (leading) is provided. The composition of the non-magnetic granular layer 120 can be a granular structure by segregation of a non-magnetic substance including one or a plurality of oxides between non-magnetic crystal grains formed of a Co-type alloy to form a grain boundary. In particular, CoCr—$SiO_2$ and CoCrRu—$SiO_2$ can be suitably used. And, furthermore, in place of Ru, Rh (rhodium), Pd (palladium), Ag (silver), Os (osmium), Ir (iridium), and Au (gold) can also be used. Still further, the non-magnetic substance is a substance in which a grain boundary part can be formed around magnetic particles so that an exchange interaction operation between magnetic particles (magnetic grains) is suppressed or interrupted, and can be any as long as it is an oxide (non-magnetic substance) that is not incorporated into cobalt (Co). Examples can include silicon oxide (SiOx), chrome (Cr), chrome oxide ($CrO_2$), titanium oxide ($TiO_2$), zircon oxide ($ZrO_2$), and tantalum oxide ($Ta_2O_5$) as an oxide.

The magnetic recording layer 122 has a granular structure in a columnar shape in which a non-magnetic substance including one or a plurality of oxides is subjected to segregation between magnetic grains of a hard magnetic body selected from a Co-type alloy, a Fe-type alloy, and a Ni-type alloy. By providing the non-magnetic granular layer 120, these magnetic particles can make an epitaxial growth continuously from their granular structure.

Although the magnetic recording layer 122 may be a single layer, it is configured of a first magnetic recording layer 122a and a second magnetic recording layer 122b different in composition and film thickness in the present embodiment. That is, the first magnetic recording layer 122a is formed continuously with the non-magnetic granular layer 120. The second magnetic recording layer 122b is formed continuously with the first magnetic recording layer 122a. In the second magnetic recording layer 122b, by appropriately setting its composition and film thickness, the coercive force Hc can be increased.

In both of the first magnetic recording layer 122a and the second magnetic recording layer 122b, examples of an oxide contained in the non-magnetic substance can include silicon oxide (SiOx), chrome (Cr), chrome oxide ($CrO_2$), titanium oxide ($TiO_2$), zircon oxide ($ZrO_2$), and tantalum oxide ($Ta_2O_5$).

In particular, in the present embodiment, two or more oxides are contained in combination in either or both of the first magnetic recording layer 122a and the second magnetic recording layer 122b. Here, the types of oxides to be contained are not restricted. However, in particular, $SiO_2$ and $TiO_2$ are preferably contained. Next, in place of/addition to either thereof, $Cr_2O_3$ is preferably used.

Here, in the present embodiment, at least one oxide included in the grain boundary part of the non-magnetic granular layer 120 and at least one oxide included in the grain boundary part of the first magnetic recording layer 122a are oxides of a same composition. Furthermore, at least one oxide included in the grain boundary part of the first magnetic recording layer 122a and at least one oxide included in the grain boundary part of the second magnetic recording layer 122b are oxides of a same composition.

FIG. 2 depicts diagrams depicting the configuration of oxides included in the non-magnetic granular layer and the magnetic recording layer according to the present embodiment.

Figure 2A:
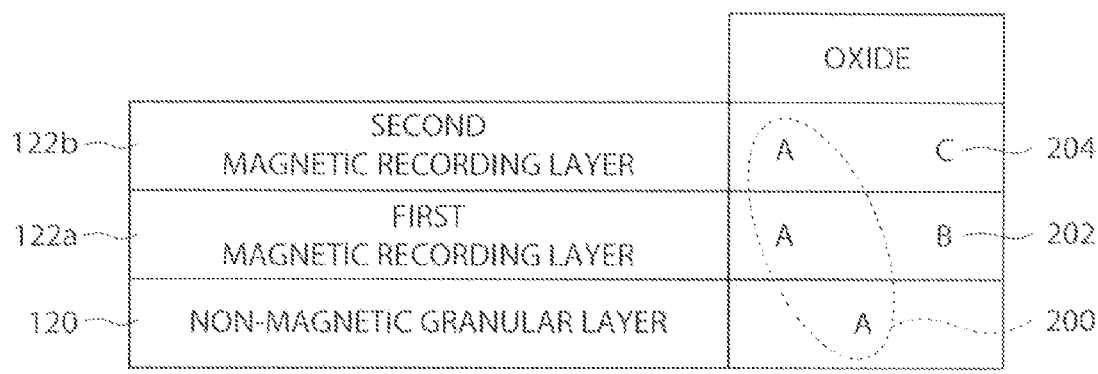
[FIG. 2] Diagrams depicting the configuration of oxides included in a non-magnetic granular layer and a magnetic recording layer according to an embodiment.

In an example depicted in FIG. 2(a), in the non-magnetic granular layer 120, a first oxide A is contained. In the first magnetic recording layer 122a, the first oxide A and a second oxide B are contained. In the second magnetic recording layer 122b, the first oxide A and a third oxide C are contained. That is, the first oxide A of the same composition is contained in the non-magnetic granular layer 120, the first magnetic recording layer 122a, and the second magnetic recording layer 122b. Here, the first oxide A, the second oxide B, and the third oxide C are different oxides.

Figure 2B:
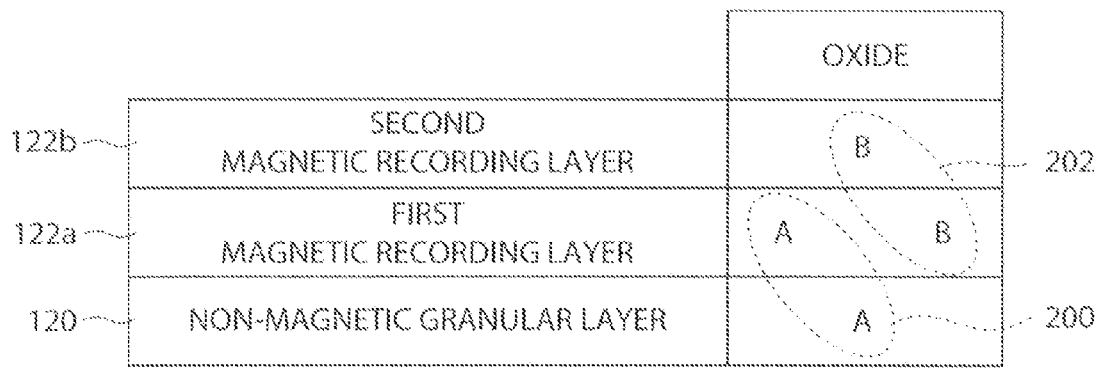

In an example depicted in FIG. 2(b), in the non-magnetic granular layer 120 and the first magnetic recording layer 122a, the first oxide A is contained. In the first magnetic recording layer 122a and the second magnetic recording layer 122b, the second oxide B is contained. That is, the oxide of the same composition is contained in the grain boundary parts of continuing layers among the non-magnetic granular layer 120, the first magnetic recording layer 122a, and the second magnetic recording layer 122b.

According to the above structure, by making the oxide of the same composition contained in the grain boundary parts of continuing layers, an affinity between the grain boundary parts at each interface can be increased. Therefore, not only the crystal grains but also the grain boundary parts continuously grow from a lower layer. Thus, separation and isolation of the magnetic grains of the magnetic recording layer can be further promoted. With this, an electromagnetic transducing characteristic (in particular, SNR) and a magnetostatic characteristic (in particular, the coercive force Hc) can be enhanced.

The continuous layer 124 is a magnetically continuous layer (also referred to as a continuous layer) in an in-plane direction on the magnetic recording layer 122 having a granular structure. Although the continuous layer 124 is not necessarily required, by providing this, a high-density recording property and a low-noise property of the magnetic recording layer 122 can be achieved. In addition, it is possible to enhance an inverted-magnetic-domain nucleation magnetic field Hn, improve a heat-resistant fluctuation characteristic, and improve an overwrite characteristic (OW characteristic).

Note that, as the continuous layer 124, not a single layer but a layer of a CGC structure (Coupled Granular Continuous) may be used in which a thin film (continuous layer) is formed that shows a high perpendicular magnetic anisotropy and a high saturation magnetization Ms. Note that the CGC structure can be configured of a magnetic recording layer having a granular structure, a thin-film coupling control layer made of a non-magnetic substance, such as Pd or Pt, and an exchange energy control layer formed of an exchange multilayered film in which thin films of CoB and Pd are multilayered.

The medium protective layer 126 can be formed by forming a film out of carbon by CVD while keeping a vacuum state. The medium protective layer 126 is a protective layer for protecting the perpendicular magnetic recording layer from a shock of the magnetic head. In general, a carbon film formed by CVD has an improved film hardness compared with the one formed by sputtering. Therefore the perpendicular magnetic recording layer can be more effectively protected from a shock from the magnetic head.

The lubricating layer 128 can be formed by forming a film out of perfluoropolyether (PFPE) by dip coating. PFPE has a molecular structure in a long chain shape, and is coupled to an N atom on the surface of the medium protective layer 126 with high affinity. With this operation of the lubricating layer 128, a damage or loss of the medium protective layer 126 can be prevented even if the magnetic head makes contact with the surface of the perpendicular magnetic recording medium 100.

With the above manufacturing processes, the perpendicular magnetic recording medium 100 can be obtained. In the following, effectiveness of the present invention is described by using an example and comparative examples.

(Examples and Evaluation)

On the disk base 110, by using a vacuumed film forming device, the adhesion layer 112 to the continuous layer 124 were sequentially formed in an Ar atmosphere by DC magnetron sputtering. The adhesive layer 112 was of CrTi.

In the soft magnetic layer 114, the composition of the first soft magnetic layer 114a and the second soft magnetic layer 114c was of CoCrFeB, and the composition of the spacer layer 114b was of Ru. The composition of the preliminary ground layer 116 was of an NiW alloy with an fcc structure. In the ground layer 118, the first ground layer 118a was formed out of Ru under low-pressure Ar, and the second ground layer 118b was formed out of Ru under high-pressure Ar. The composition of the grain boundary parts of the non-magnetic granular layer 120, the first magnetic recording layer 122a, and the second magnetic recording layer 122b are formed with the configurations of the following examples and comparison examples. The composition of the continuous layer 124 was of CoCrPtB. As for the medium protective layer 126, a film was formed by using $C_2H_4$ and CN by CVD. And the lubricating layer 128 was formed by using PFPE by dip coating.

Here, what type of relation between the SNR and the coercive force Hc was found depending on the difference of the oxides contained in the non-magnetic granular layer 120, the first magnetic recording layer 122a, and the second magnetic recording layer 122b is described below.

FIG. 3 is a diagram depicting examples and comparison examples of oxides included in the non-magnetic granular layer 120, the first magnetic recording layer 122a, and the second magnetic recording layer 122b. First and second examples are examples in which a plurality of oxides are contained in the grain boundary part of the first magnetic recording layer 122a and an common oxide ($SiO_2$) is contained in the grain boundary parts of all of the non-magnetic granular layer 120, the first magnetic recording layer 122a, and the second magnetic recording layer 122b. A third example is an example in which a common oxide ($SiO_2$) is contained in the grain boundary parts of all three layers but the first magnetic recording layer 122a contains only a single oxide. A fourth example is an example in which a plurality of oxides are contained in the first magnetic recording layer 122a and an oxide of a same composition is contained in the non-magnetic granular layer 120 and the first magnetic recording layer 122a, but an oxide of a same composition is not contained in the second magnetic recording layer 122b and the first magnetic recording layer 122a.

As comparison examples for comparison with the above examples, those are set in which an oxide of a same composition is not contained in the grain boundary parts of the non-magnetic granular layer 120 and the magnetic recording layer 122 formed continuously therewith. A first comparison example is an example in which an oxide of a same composition is not included in the grain boundary parts of continuing layers. A second comparison example is an example in which oxides in the first magnetic recording layer 122a and the second magnetic recording layer 122b have the same composition, but an oxide of a same composition as that in the non-magnetic granular layer 120 is not contained in the first magnetic recording layer 122a.

As depicted in the drawing, the SNR and Hc of the first and second examples both show high values. Thus, an overall evaluation was high. As overall evaluations similarly found regarding other examples and comparison examples, the SNR of the third and fourth examples are slightly inferior to that of the first example. However, as an overall evaluation, these examples can hold as products. In the first and second comparison examples, the SNR is mainly inferior. Therefore, it was difficult to say that these examples are suitable in future increase in recording density.

Figure 4A:
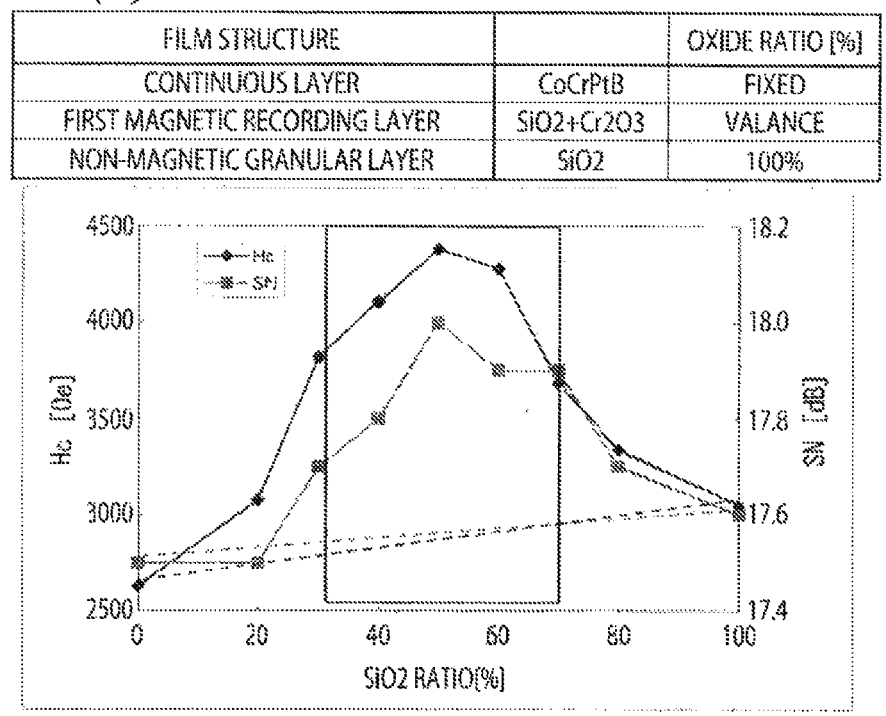
[FIG. 4] Diagrams for describing a relation among an SNR and Hc, and a percentage content of an oxide.
Figure 4B:
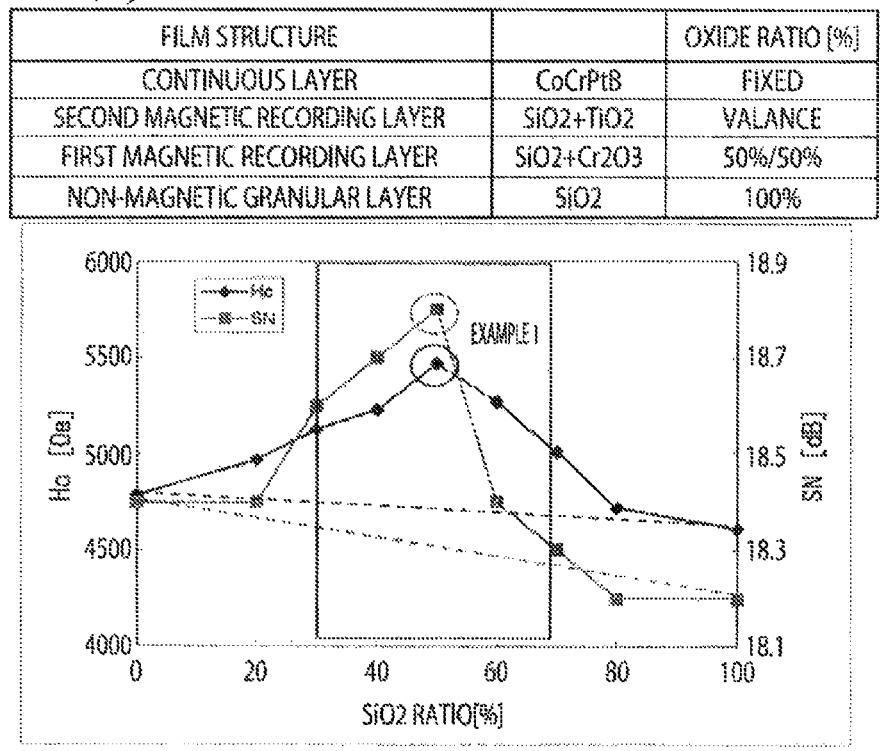

FIG. 4 depicts diagrams for describing a relation among SNR and Hc, and a percentage content of an oxide. In the drawings, a plot above a dotted line represents an effect by setting a composite oxide as a first magnetic recording layer. In FIG. 4(a), for the sake of comparison, no second magnetic recording layer is provided, and a magnetic recording layer of a single layer is used. FIG. 4(b) depicts the configuration of the above first example, that is, a film configuration in which $SiO_2$ is contained in the first and second magnetic recording layer. As can be seen from the drawings, an oxide of a same composition is contained in the grain boundary parts of the non-magnetic granular layer 120 and the first magnetic recording layer 122a. Also, in particular, in all oxides in each grain boundary part, if a percentage content of the common oxide is not less than 30 mol % and not more than 70 mol %, it is found that high SNR and HC can both be achieved. Also, by making the common oxide contained also in the second magnetic recording layer, it is found that higher SNR and Hc can both be achieved.

In other words, in the configuration of FIG. 4(b), the non-magnetic granular layer 120 is of a single oxide, the first magnetic recording layer 122a is of a composite oxide, and the oxide of the same composition included in the first magnetic recording layer 122a as that of the non-magnetic granular layer 120 is not less than 30 mol % and not more than 70 mol %, thereby obtaining the above effect. Similarly, when the non-magnetic granular layer 120 is of a composite oxide and the grain boundary part of the first magnetic recording layer 122a is of a single oxide, the oxide of the same composition included in the non-magnetic granular layer 120 as that of the first magnetic recording layer 122a can be not less than 30 mol % and not more than 70 mol %. Also, when the grain boundary parts of both of the non-magnetic granular layer 120 and the first magnetic recording layer 122a are composite oxides, a percentage content of the oxide of the same composition in each of the grain boundary parts can be not less than 30 mol % and not more than 70 mol %.

Figures 5A, 5B, 5C:
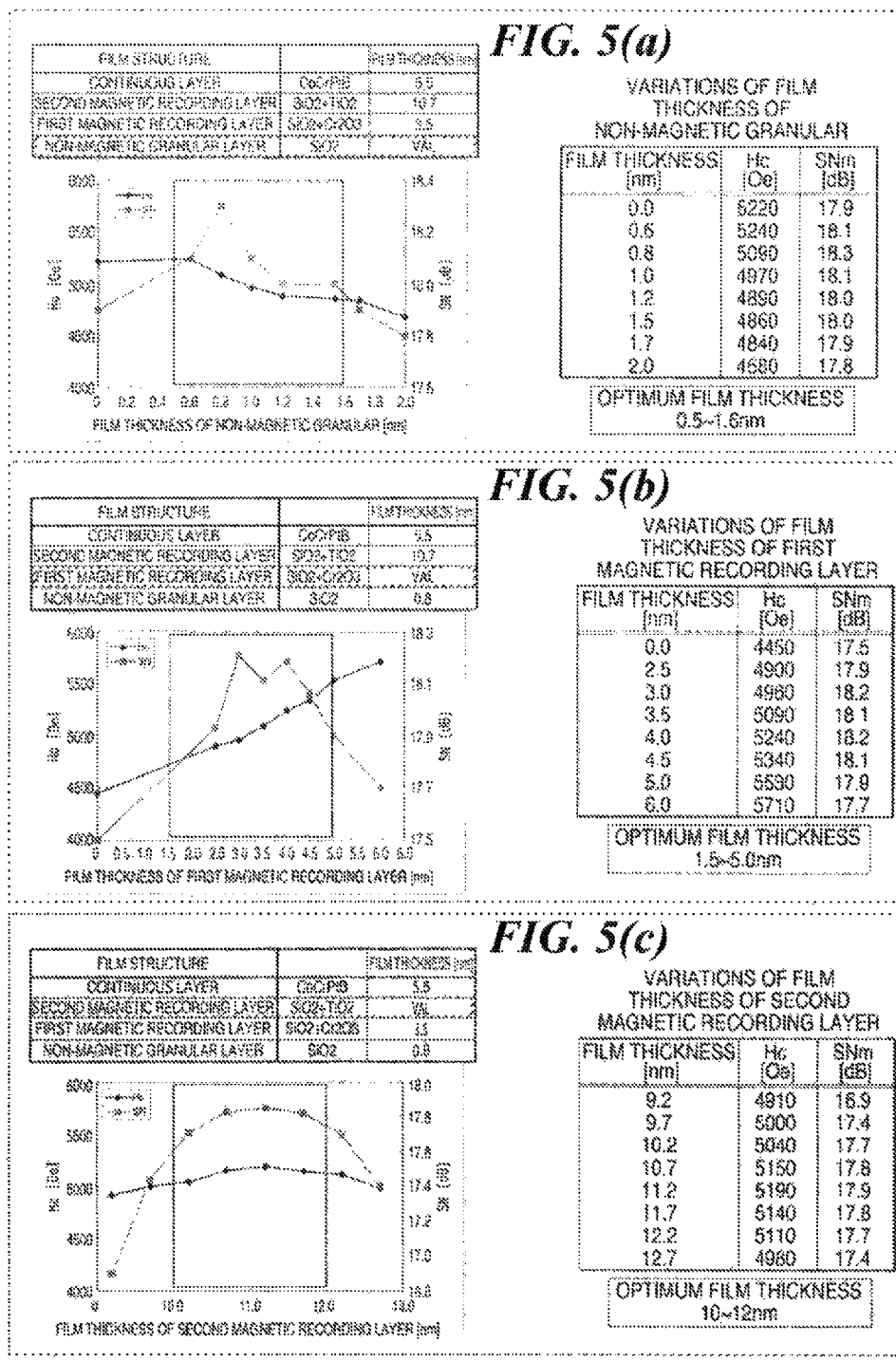
[FIG. 5] Diagrams for comparing SNR and Hc depending on the difference of the film thickness of the non-magnetic granular layer, the first magnetic recording layer, and the second magnetic recording layer.

FIG. 5 depicts diagrams for comparing SNR and Hc depending on the difference of the film thickness of the non-magnetic granular layer 120, the first magnetic recording layer 122a, and the second magnetic recording layer 122b. In FIG. 5(a), the first magnetic recording layer 122a is set at 3.5 nm, the second magnetic recording layer 122b is set at 10.7 nm, and the non-magnetic granular layer 120 is varied. As a result, it was found that the film thickness of the non-magnetic granular layer is preferably in a range of 0.5 to 1.6 nm. It was also found that, in particular, around 0.8 nm is further preferable. In FIG. 5(b), with the film thickness of the non-magnetic granular layer being set at 0.8 nm, the film thickness of the first magnetic recording layer 122a was varied. As a result, it was found that 1.5 to 5.0 nm is preferable. It was also found that, in particular, around 3 to 4 nm is further preferable. In FIG. 5(c), with the film thickness of the non-magnetic granular layer 120 being set at 0.8 nm and the film thickness of the first magnetic recording layer 122a being set at 3.5 nm, the film thickness of the second magnetic recording layer 122b was varied. As a result, it was found that 10 to 12 nm is most preferable. From these, it was found that when an oxide of a same composition is contained in the grain boundary parts of the non-magnetic granular layer 120 and the first magnetic recording layer 122a and a relation of the non-magnetic granular layer 120<the first magnetic recording layer 122a<the second magnetic recording layer holds regarding the film thickness, the configuration can be obtained in which the SNR and the coercive force Hc are both be achieved.

Note that each of the examples and comparison examples has been described in which a single oxide is contained in the grain boundary part of the non-magnetic granular layer 120. However, even if a plurality of oxides are contained in the non-magnetic granular layer 120, the effect of the present invention can be obtained similarly to the above by making the same oxide as that of the non-magnetic granular layer 120 contained in the first magnetic recording layer 122a.

In each of the examples and comparison examples, description has been made with the magnetic recording layer 122 as including the first magnetic recording layer 122a and the second magnetic recording layer 122b. However, even if the magnetic recording layer is a single layer, the effect of the present invention can be obtained similarly to the above by making an oxide having the same composition as that of the non-magnetic granular layer 120 contained in the grain boundary part.

As described above, by adding a common oxide to the grain boundary parts of the non-magnetic granular layer and the magnetic recording layer, an affinity between the grain boundary parts at each interface can be increased. Therefore, not only the crystal grains but also the grain boundary parts continuously grow from a lower layer. Thus, separation and isolation of the magnetic grains of the magnetic recording layer can be further promoted. And, in the magnetic recording layer, an electromagnetic transducing characteristic (in particular, SNR) and a magnetostatic characteristic (in particular, the coercive force Hc) can be enhanced.

In the foregoing, with reference to the attached drawings, preferred examples of the present invention have been described. However, needless to say, the present invention is not meant to be restricted by such examples. It is obvious that a person skilled in the art can conceive various modification examples and corrected examples within a category described in the scope of claims for patent. As a matter of course, it is understood that these also belong to the technical scope of the present invention.

INDUSTRIAL APPLICABILITY

The present invention can be utilized as a perpendicular magnetic recording medium mounted on an HDD or the like of perpendicular magnetic recording type.

The invention claimed is:

1. A perpendicular magnetic recording medium comprising:
   a substrate,
   a non-magnetic granular layer formed on said substrate with a thickness in a range of 0.5 nm to 1.6 nm and having a granular structure in which a grain boundary part including one or a plurality of oxides is formed between non-magnetic grains each continuously grown in a columnar shape; and
   a magnetic recording layer formed continuously with the non-magnetic granular layer and having a granular structure in which a grain boundary part including one or a plurality of oxides is formed between magnetic grains continuously grown in a columnar shape in this order, wherein
   at least one oxide included in the grain boundary part of the non-magnetic granular layer and at least one oxide included in the grain boundary part of the magnetic recording layer are oxides of a same composition,
   wherein the magnetic recording layer includes
   a first magnetic recording layer formed continuously with the non-magnetic granular layer with a thickness in a range of 1.5 nm to 5.0 nm and having a granular structure in which a grain boundary part including a plurality of oxides is formed between magnetic grains continuously grown in a columnar shape, and
   a second magnetic recording layer formed continuously with the first magnetic recording layer with a thickness in a range of 10.0 nm to 12.0 nm and having a granular structure in which a grain boundary part including one or a plurality of oxides is formed between magnetic grains continuously grown in a columnar shape,
   wherein the compositions of the first magnetic recording layer and the second magnetic recording layer differ as to the chemical elements constituting the first magnetic layer and the second magnetic layer, and
   wherein at least one oxide included in the grain boundary part of the first magnetic recording layer and at least one oxide included in the grain boundary part of the second magnetic recording layer are oxides of a same composition.

2. A perpendicular magnetic recording medium comprising:
   a substrate,
   a non-magnetic granular layer formed on said substrate and having a granular structure in which a grain boundary part including one or a plurality of oxides is formed between non-magnetic grains each continuously grown in a columnar shape; and
   a magnetic recording layer formed continuously with the non-magnetic granular layer and having a granular structure in which a grain boundary part including one or a plurality of oxides is formed between magnetic grains continuously grown in a columnar shape in this order, wherein at least one oxide included in the grain boundary part of the non-magnetic granular layer and at least one oxide included in the grain boundary part of the magnetic recording layer are oxides of a same composition, and wherein the oxides of the same composition included in the grain boundary part of the non-magnetic granular layer and the grain boundary part of the magnetic recording layer each have a percentage content not less than 30 mol% and not more than 70 mol % in the grain boundary part.

3. A perpendicular magnetic recording medium comprising:

a substrate, a non-magnetic granular layer formed on said substrate and having a granular structure in which a grain boundary part including one or a plurality of oxides is formed between non-magnetic grains each continuously grown in a columnar shape; and a magnetic recording layer formed continuously with the non-magnetic granular layer and having a granular structure in which a grain boundary part including one or a plurality of oxides is formed between magnetic grains continuously grown in a columnar shape in this order, wherein the magnetic recording layer includes a first magnetic recording layer formed continuously with the non-magnetic granular layer and having a granular structure in which a grain boundary part including a plurality of oxides is formed between magnetic grains continuously grown in a columnar shape, and a second magnetic recording layer formed continuously with the first magnetic recording layer and having a granular structure in which a grain boundary part including one or a plurality of oxides is formed between magnetic grains continuously grown in a columnar shape, and at least one oxide included in the grain boundary part of the first magnetic recording layer and at least one oxide included in the grain boundary part of the second magnetic recording layer are oxides of a same composition, and wherein in the grain boundary part between the non-magnetic granular layer and the first magnetic recording layer or between the first magnetic recording layer and the second magnetic recording layer, oxides of a same composition included in a grain boundary part of an adjacent layer each have a percentage content not less than 30 mol% and not more than 70 mol % in the grain boundary part.

4. A perpendicular magnetic recording medium comprising:

a substrate, a non-magnetic granular layer formed on said substrate with a thickness in a range of 0.5 nm to 1.6 nm and having a granular structure in which a grain boundary part including one or a plurality of oxides is formed between non-magnetic grains each continuously grown in a columnar shape; and a magnetic recording layer formed continuously with the non-magnetic granular layer and having a granular structure in which a grain boundary part including one or a plurality of oxides is formed between magnetic grains continuously grown in a columnar shape in this order, wherein at least one oxide included in the grain boundary part of the non-magnetic granular layer and at least one oxide included in the grain boundary part of the magnetic recording layer are oxides of a same composition, wherein the magnetic recording layer includes a first magnetic recording layer formed continuously with the non-magnetic granular layer with a thickness in a range of 1.5 nm to 5.0 nm and having a granular structure in which a grain boundary part including a plurality of oxides is formed between magnetic grains continuously grown in a columnar shape, and a second magnetic recording layer formed continuously with the first magnetic recording layer with a thickness in a range of 10.0 nm to 12.0 nm and having a granular structure in which a grain boundary part including one or a plurality of oxides is formed between magnetic grains continuously grown in a columnar shape, wherein the compositions of the first magnetic recording layer and the second magnetic recording layer differ as to materials, wherein at least one oxide included in the grain boundary part of the first magnetic recording layer and at least one oxide included in the grain boundary part of the second magnetic recording layer are oxides of a same composition, and wherein the non-magnetic granular layer, the first magnetic recording layer, and the second magnetic recording layer each have a film thickness so as to have a relation of the non-magnetic granular layer<first magnetic recording layer<the second magnetic recording layer.

5. The perpendicular magnetic recording medium according to claim 1, wherein the oxide in the non-magnetic granular layer, the first magnetic recording layer, and the second magnetic recording layer comprises $SiO_2$.

6. The perpendicular magnetic recording medium according to claim 1, wherein the compositions of the first magnetic recording layer and the second magnetic recording layer differ based on different oxide composition content.

7. The perpendicular magnetic recording medium according to claim 4, wherein the compositions of the first magnetic recording layer and the second magnetic recording layer differ based on different oxide composition content.

* * * * *